US012756031B2

(12) United States Patent
Sielaff et al.

(10) Patent No.: US 12,756,031 B2
(45) Date of Patent: Oct. 6, 2026

(54) TRACTION BATTERY PACK THERMAL MANAGEMENT SYSTEM AND METHOD

(71) Applicant: Ford Global Technologies, LLC, Dearborn, MI (US)

(72) Inventors: Jason Luke Sielaff, Brighton, MI (US); Bhaskara Rao Boddakayala, Troy, MI (US); Parikshit S. Gupte, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 764 days.

(21) Appl. No.: 18/176,605

(22) Filed: Mar. 1, 2023

(65) Prior Publication Data

US 2024/0297361 A1 Sep. 5, 2024

(51) Int. Cl.

| | |
|---|---|
| ***H01M 10/6554*** | (2014.01) |
| ***H01M 10/6556*** | (2014.01) |
| ***H01M 10/6567*** | (2014.01) |
| ***H01M 10/658*** | (2014.01) |
| *H01M 10/613* | (2014.01) |
| *H01M 10/625* | (2014.01) |

(52) U.S. Cl.

CPC ... *H01M 10/6554* (2015.04); *H01M 10/6556* (2015.04); *H01M 10/6567* (2015.04); *H01M 10/658* (2015.04); *H01M 10/613* (2015.04); *H01M 10/625* (2015.04); *H01M 2220/20* (2013.01)

(58) Field of Classification Search

CPC ............. H01M 10/613; H01M 10/625; H01M 10/6554; H01M 10/6556; H01M 10/6567; H01M 10/658; H01M 2220/20

See application file for complete search history.

(56) References Cited

U.S. PATENT DOCUMENTS

| | | | | |
|---|---|---|---|---|
| 8,785,026 | B2 | 7/2014 | Hu et al. | |
| 9,397,375 | B2 | 7/2016 | Biskup et al. | |
| 2022/0069380 | A1* | 3/2022 | Dorgan ............... | H01M 10/647 |
| 2022/0363144 | A1* | 11/2022 | Boddakayala ...... | H01M 10/653 |

FOREIGN PATENT DOCUMENTS

| | | |
|---|---|---|
| CN | 206742456 | 12/2017 |
| CN | 109473744 | 3/2019 |
| WO | 2021209187 | 10/2021 |

* cited by examiner

*Primary Examiner* — Lingwen R Zeng

(74) *Attorney, Agent, or Firm* — David B. Kelley; Carlson, Gaskey & Olds, P.C.

(57) ABSTRACT

A thermal management system for a traction battery pack includes a cell stack having a plurality of battery cells, and a thermal exchange device adjacent the at least one cell stack. The thermal exchange device has at least one coolant passageway that communicates a coolant, and a plurality of thermal breaks configured to inhibit thermal energy transfer from a first area of the thermal exchange device to a different, second area of the thermal exchange device.

9 Claims, 3 Drawing Sheets

TRACTION BATTERY PACK THERMAL MANAGEMENT SYSTEM AND METHOD

TECHNICAL FIELD

This disclosure relates generally to a thermal exchange device that includes thermal breaks to help manage thermal energy within a battery pack.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines. The traction battery pack assembly of an electrified vehicle can include battery cells.

SUMMARY

In some aspects, the techniques described herein relate to a thermal management system for a traction battery pack, including: at least one cell stack having a plurality of battery cells; a thermal exchange device adjacent the at least one cell stack, the thermal exchange device having at least one coolant passageway that communicates a coolant; and a plurality of thermal breaks in the thermal exchange device, the plurality of thermal breaks configured to inhibit thermal energy transfer from a first area of the thermal exchange device to a different, second area of the thermal exchange device.

In some aspects, the techniques described herein relate to a thermal management system, wherein the thermal exchange device includes at least one plate, the plurality of thermal breaks provided at least in part by apertures in the at least one plate.

In some aspects, the techniques described herein relate to a thermal management system, further including a thermally insulative material within the apertures.

In some aspects, the techniques described herein relate to a thermal management system, wherein the apertures extend completely through the thermal exchange device.

In some aspects, the techniques described herein relate to a thermal management system, wherein at least one cell stack includes a plurality of dividers disposed along a cell stack axis with the plurality of battery cells, the dividers separating groups of at least one battery cell along the cell stack axis, the plurality of thermal breaks aligned with the plurality of dividers along the cell stack axis.

In some aspects, the techniques described herein relate to a thermal management system, wherein the plurality of thermal breaks extend longitudinally in a direction that is transverse to the cell stack axis.

In some aspects, the techniques described herein relate to a thermal management system, wherein the at least one coolant passageway circumferentially surrounds each thermal break within the plurality of thermal breaks.

In some aspects, the techniques described herein relate to a thermal management system, wherein the thermal exchange device includes a first plate and a second plate, wherein the first plate and the second plate are spaced a distance from each other in some areas to provide the at least one coolant passageway.

In some aspects, the techniques described herein relate to a thermal management system, wherein the first plate and the second plate are metal or metal alloy.

In some aspects, the techniques described herein relate to a thermal management system, wherein the plurality of thermal breaks include apertures that open to a first side of the thermal exchange device and to an opposite, second side of the thermal exchange device, the first side facing with the at least one cell stack, the second side facing away from the at least one cell stack.

In some aspects, the techniques described herein relate to a thermal management system, wherein the apertures are filled with a thermally insulative material.

In some aspects, the techniques described herein relate to a thermal management system, wherein the at least one cell stack and the thermal exchange device are constituents of a traction battery pack.

In some aspects, the techniques described herein relate to a battery pack thermal management method, including: establishing thermal breaks within a thermal exchange device to inhibiting thermal energy transfer from a first group of battery cells that are aligned with a first area of the thermal exchange device to a second group of battery cells that are aligned with a different, second area of the thermal exchange device, the first and second groups of battery cells within a cell stack.

In some aspects, the techniques described herein relate to a battery pack thermal management method, wherein the thermal breaks are openings in the thermal exchange device.

In some aspects, the techniques described herein relate to a battery pack thermal management method, wherein the openings extend completely through the thermal exchange device.

In some aspects, the techniques described herein relate to a battery pack thermal management method, wherein the openings are filled with a thermally insulative material.

In some aspects, the techniques described herein relate to a battery pack thermal management method, wherein the openings are adjacent respective dividers within the cell stack.

In some aspects, the techniques described herein relate to a battery pack thermal management method, wherein the thermal exchange device communicates a coolant to manage thermal energy within the cell stack.

In some aspects, the techniques described herein relate to a battery pack thermal management method, further including stamping the thermal exchange device to establish the thermal breaks.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details battery packs having thermal exchange devices that communicate coolant to manage thermal energy. Thermal breaks within the thermal exchange devices can block thermal energy from transferring through certain areas of the thermal exchange devices.

Figure 1:
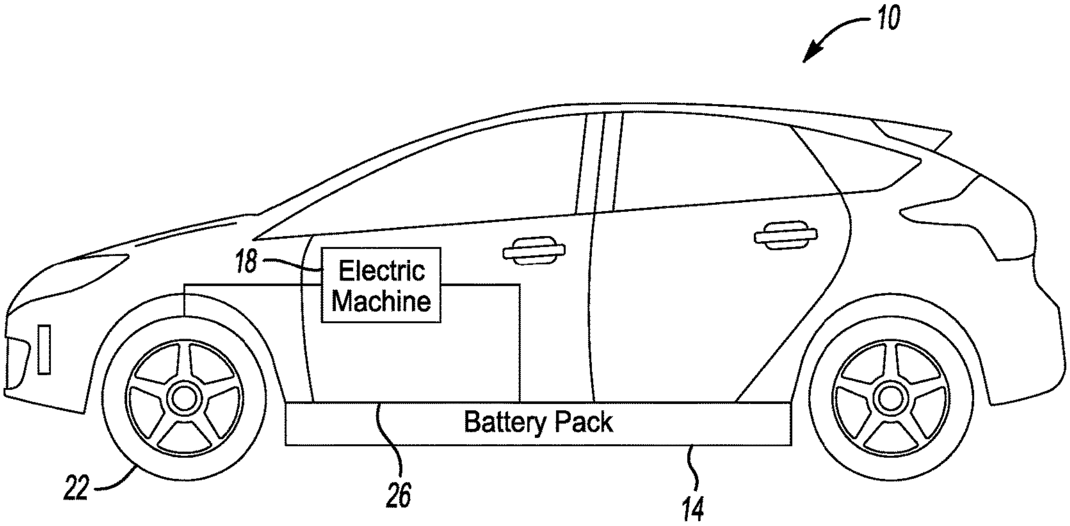
FIG. 1 illustrates a side view of an example electrified vehicle.

With reference to FIG. 1, an electrified vehicle 10 includes a traction battery pack assembly 14, an electric machine 18, and wheels 22. The traction battery pack assembly 14 powers an electric machine 18, which can convert electrical power to mechanical power to drive the wheels 22. The traction battery pack assembly 14 can be a relatively high-voltage battery.

The traction battery pack assembly 14 is, in the exemplary embodiment, secured to an underbody 26 of the electrified vehicle 10. The traction battery pack assembly 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

Figure 2:
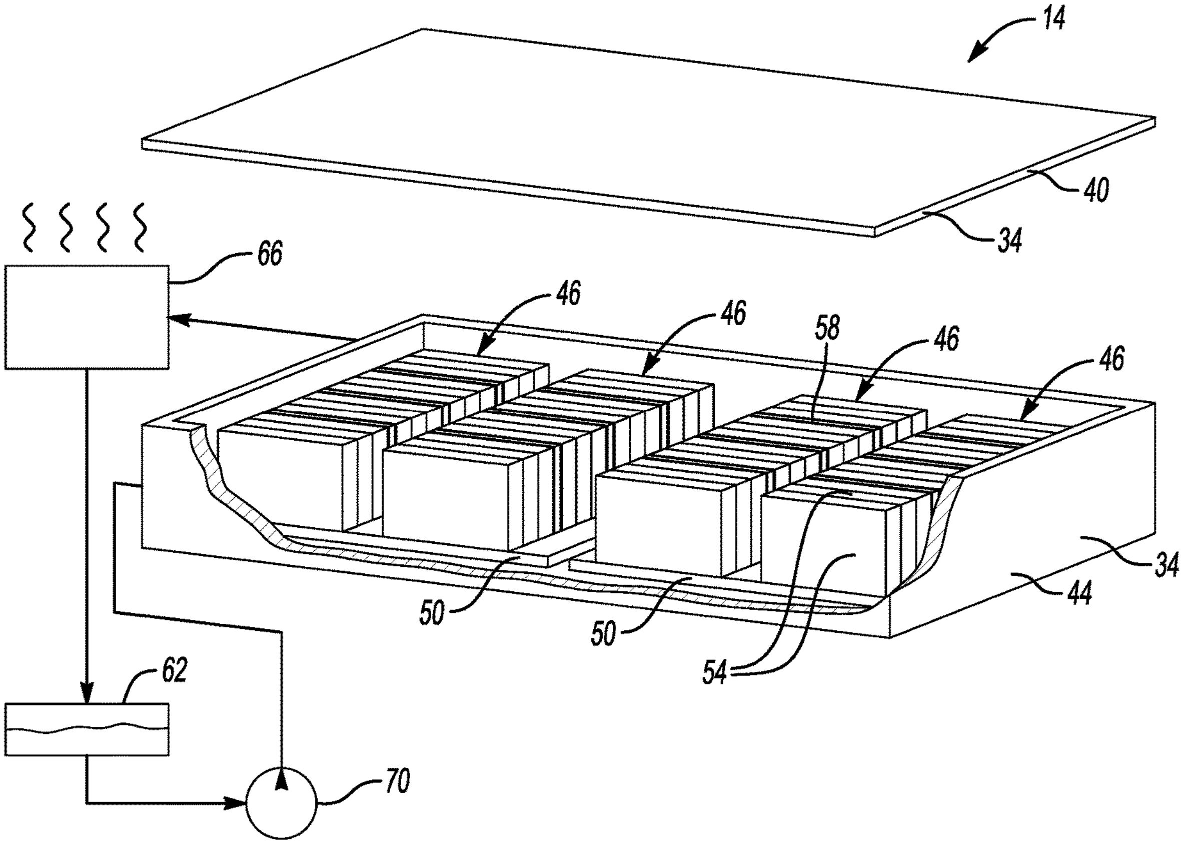
FIG. 2 illustrates a perspective, expanded view of a battery pack from the electrified vehicle of FIG. 1.
Figure 3:
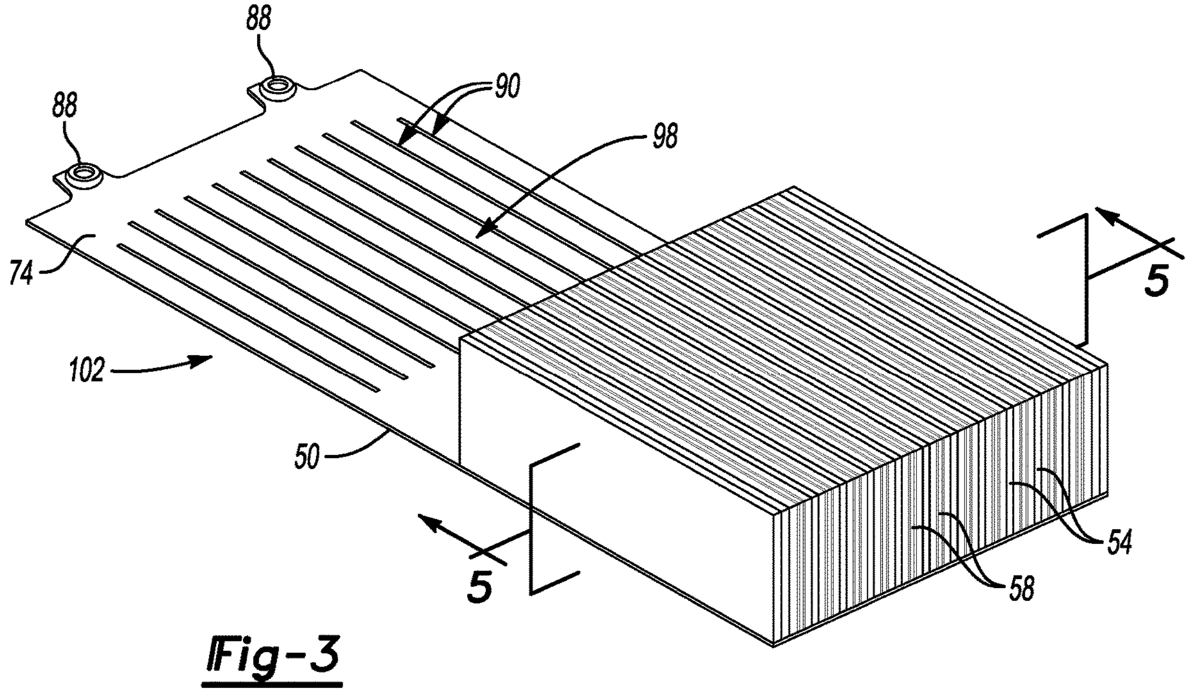
FIG. 3 shows a perspective view of one of the cell stacks and one of the thermal exchange devices from the battery pack of FIG. 2.
Figure 4:
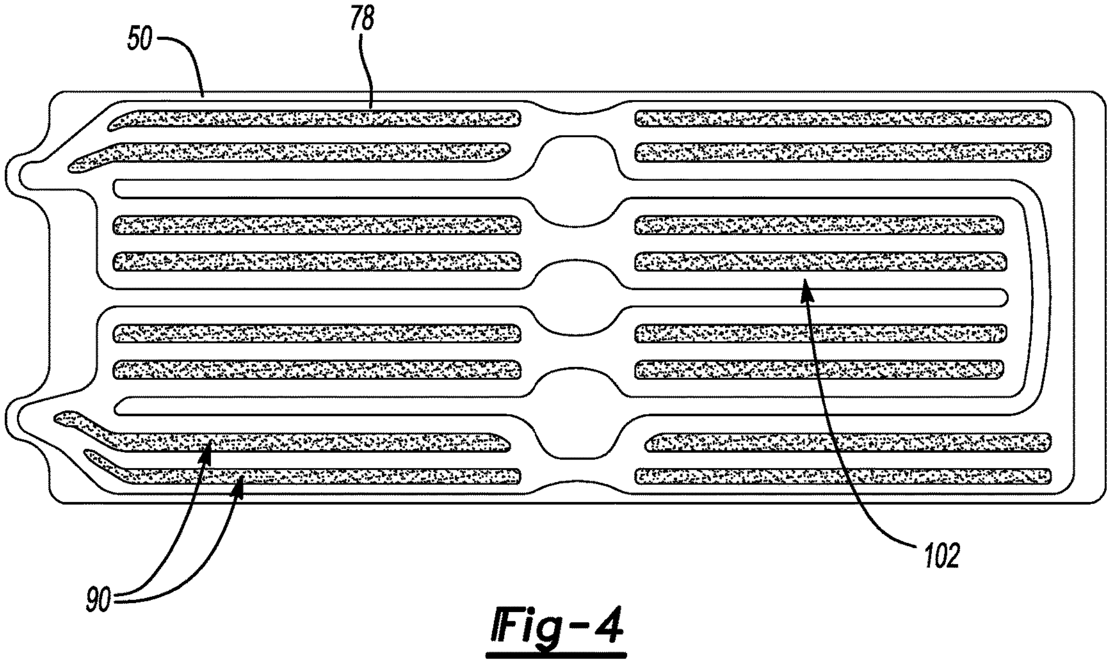
FIG. 4 shows a bottom view of a thermal exchange device from FIG. 3.
Figure 5:
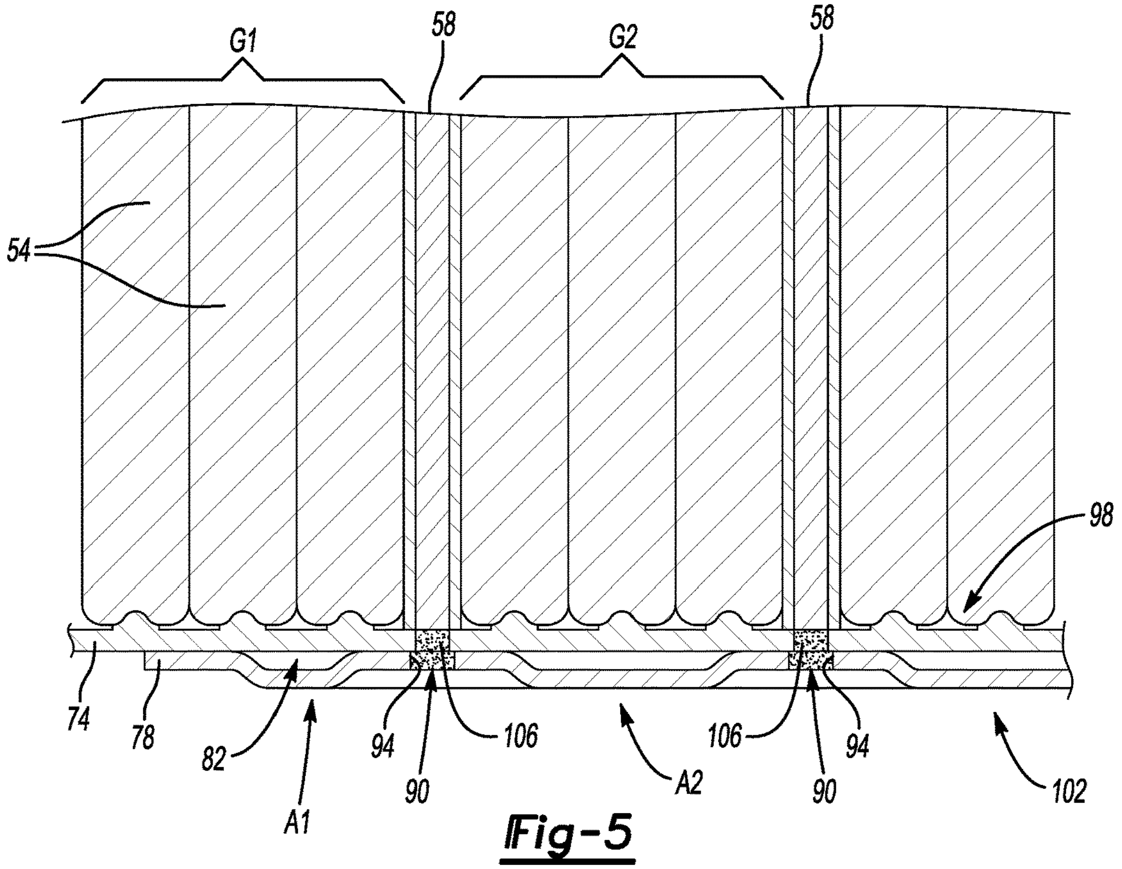
FIG. 5 is a section view of a portion of the cell stack and thermal exchange device taken at line 5-5 in FIG. 3.
Figure 6:
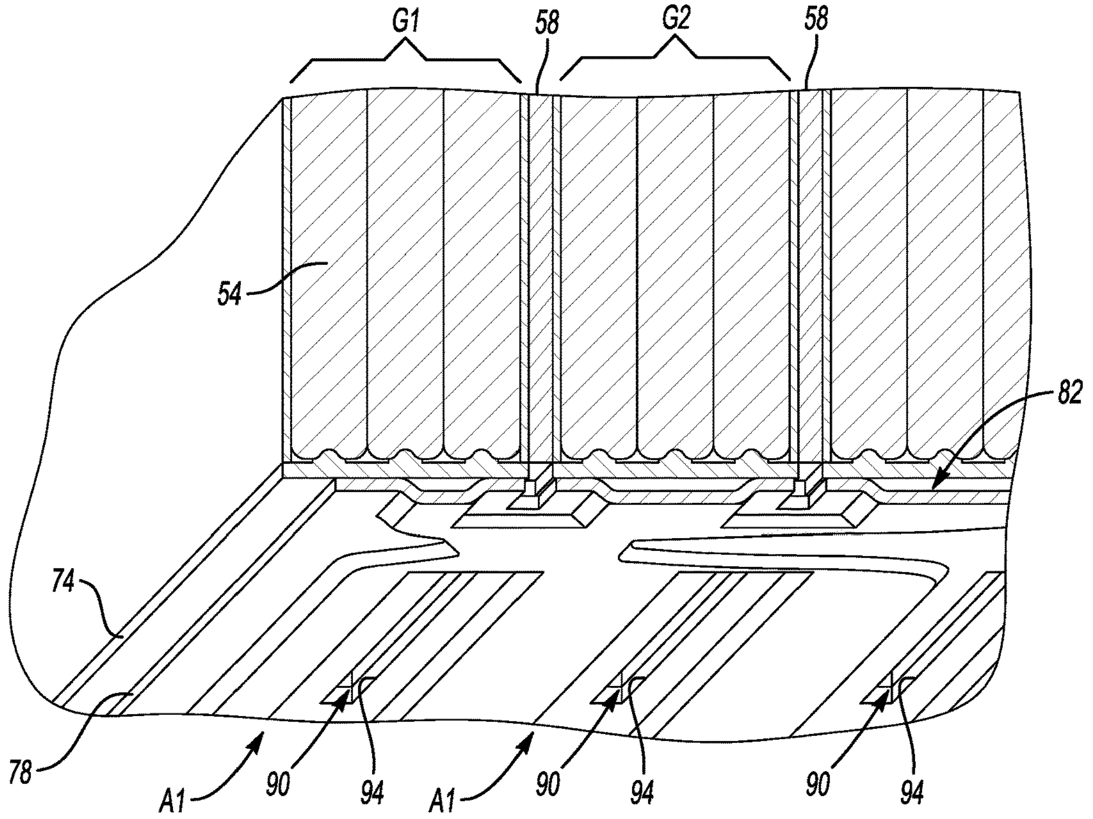
FIG. 6 is a perspective view of selected portions of the section of FIG. 5 and with thermally insulative material omitted from the thermal breaks within the thermal exchange device.

With reference now to FIG. 2, the traction battery pack assembly 14 includes an enclosure assembly 34 housing a plurality of cell stacks 46 and at least one thermal exchange device 50.

In the exemplary embodiment, the enclosure assembly 34 includes an enclosure cover 40 and an enclosure tray 44. When the enclosure assembly 34 is assembled, the enclosure cover 40 is secured to the enclosure tray 44.

In this example, four of the cell stacks 46 are housed within the enclosure assembly 34. Other numbers of cell stacks 46 could be housed within the enclosure assembly 34 in other examples. That is, the enclosure assembly 34 could house more than four cell stacks 46 or fewer than four cells stacks 46.

The cell stacks 46 each include a plurality of individual battery cells 54 and dividers 58 disposed along a respective cell stack axis. The battery cells 54 can be lithium-ion pouch cells. The dividers 58 can be mica. The dividers 58 separate groups of the battery cells 54 from each other along the cell stack axis. In this example, groups of three individual battery cells 54 are separated from each other by the dividers 58. The dividers 58 can help to inhibit transfer of thermal energy from one of the groups of battery cells 54 to axially adjacent groups of the battery cells 54.

In this example, two thermal exchange devices 50 are housed within the enclosure assembly 34. The thermal exchange devices 50 are each adjacent to two of the cells stacks 46. In particular, two cell stacks 46 are disposed atop each thermal exchange device 50. Other numbers of thermal exchange devices 50 could be used in other examples.

A coolant can circulate through the thermal exchange devices 50 to manage thermal energy levels within the cell stacks 46. The coolant can be a liquid coolant.

A coolant supply 62, a heat exchanger 66, and pump 70 are outside the enclosure assembly 34. The pump 70 can be used to move coolant from the coolant supply 62 into the enclosure assembly 34 to the thermal exchange devices 50. The coolant can, for example, take on thermal energy to cool the battery arrays 46.

The coolant the moves from the thermal exchange devices 50 to the heat exchanger 66. Thermal energy can transfer from the coolant to ambient at the heat exchanger 66. The coolant then moves from the heat exchanger 66 back to the coolant supply.

With reference now to FIGS. 3-6, the thermal exchange device 50 includes a first plate 74 and a second plate 78. Areas of the second plate 78 are spaced a distance from the first plate 74 in some others to provide a coolant passageway 82 through the thermal exchange device 50. The first plate 74 can be secured to the second plate 78 with welds, for example. The first plate 74 and the second plate 78 can be a metal or a metal-alloy.

The coolant enters the coolant passageway 82 through an inlet 86. The coolant exits the coolant passageway 82 through an outlet 88.

The coolant passageway 82, in this example, is configured such that segments of the coolant passageway 82 pass beneath each of the groups of battery cells 54. This can facilitate thermal energy transfer between the battery cells 54 and the coolant.

Notably, the thermal exchange device 50 includes a plurality of thermal breaks 90, which are configured to inhibit thermal energy transfer from a first area A1 of the thermal exchange device 50 to a different, second area A2 of the thermal exchange device 50. The area A1 is the area of the thermal exchange device 50 aligned with a first group G1 of the battery cells 54. The area A2 is the area of the thermal exchange device 50 aligned with a second group G2 of the battery cells 54.

The thermal breaks 90 inhibit thermal energy transfer from the area A1 to the area A2 and vice versa. Without the thermal breaks 90, thermal energy from the first group G1 of the battery cells 54 may be more likely to transfer to the area A1, to the A2, and then to the second group G2 of battery cells 54. Transferring thermal energy from one group of battery cells 54 within the cell stack 46 to another group of battery cells could lead to a thermal event, which may be undesirable. The thermal breaks 90 can inhibit such a transfer of thermal energy.

The thermal breaks 90, in this example, are in part provided by apertures 94 in the thermal exchange device 50. The example apertures 94 extend completely through the thermal exchange device 50. That is, the apertures 94 open to a first side 98 of the thermal exchange device 50, which is provided by the first plate 74, and open to a second side 102 of the thermal exchange device 50, which is provided by the second plate 78. The apertures 94 could be stamped into the thermal exchange device 50.

The first side 98 faces the cell stacks 46, and the second side 102 faces away from the cells stacks 46. In this example, the cell stacks 46 are vertically above the thermal exchange device 50 so the first side 98 faces vertically upward. Vertical, for purposes of this disclosure is with reference to ground and a general orientation of the vehicle 10 during operation.

Although the example apertures 94 are through-holes that extend completely through the thermal exchange device 50, apertures in other thermal breaks could be blind holes that extend partially through the thermal exchange device 50, such as only through the first plate 74 or only through the second plate 78.

The apertures 94 are longitudinally extending in this example. The apertures 94 extend longitudinally transverse to the respective cell stack axis. The apertures 94 are disposed along the cell stack axis such that the apertures 94 are aligned with the dividers 58.

In this example, the apertures 94 are filled with a thermally insulative material 106, which can help to further inhibit a transfer of thermal energy.

Within the cell stack 46, the dividers 58 inhibit thermal energy transfer. Within the thermal exchange device 50, the thermal breaks 90 inhibit thermal energy transfer. The coolant passageway 82, in this example, circumferentially surrounds the thermal breaks 90. This can help to facilitate thermal energy transferring to the coolant within the coolant passageway 82, particularly thermal energy that may build up due to the thermal break 90 inhibiting thermal energy from transferring between the first area A1 and the second area A2 through the first plate 74 and the second plate 78.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A thermal management system for a traction battery pack, comprising:

at least one cell stack having a plurality of battery cells;

a thermal exchange device adjacent the at least one cell stack, the thermal exchange device including a first plate and a second plate, the first plate and the second plate spaced from each other to provide at least one coolant passageway that communicates a coolant, the first plate having a first side that faces the at least one cell stack and the second plate having a second side opposite the first side; and a plurality of thermal breaks in the thermal exchange device, the plurality of thermal breaks configured to inhibit thermal energy transfer from a first area of the thermal exchange device to a different, second area of the thermal exchange device, the plurality of thermal breaks provided at least in part by blind-hole apertures in the first plate, the blind-hole apertures opening to the first side and not extending through the second plate.

2. The thermal management system of claim 1, further comprising a thermally insulative material within the blind-hole apertures.

3. The thermal management system of claim 1, wherein at least one cell stack includes a plurality of dividers disposed along a cell stack axis with the plurality of battery cells, the dividers separating groups of at least one battery cell along the cell stack axis, the blind-hole apertures aligned with the plurality of dividers along the cell stack axis.

4. The thermal management system of claim 3, wherein the blind-hole apertures extend longitudinally in a direction that is transverse to the cell stack axis.

5. The thermal management system of claim 1, wherein the at least one coolant passageway circumferentially surrounds each thermal break within the plurality of thermal breaks.

6. The thermal management system of claim 1, wherein the first plate and the second plate are metal or metal alloy.

7. The thermal management system of claim 1, wherein the at least one cell stack and the thermal exchange device are constituents of a traction battery pack.

8. The thermal management system of claim 1, wherein the blind-hole apertures extend longitudinally in a direction that is transverse to the cell stack axis.

9. The thermal management system of claim 1, wherein at least one cell stack includes a plurality of dividers disposed along a cell stack axis with the plurality of battery cells, the dividers separating groups of at least one battery cell along the cell stack axis, the blind-hole apertures aligned with the plurality of dividers along the cell stack axis, wherein the at least one coolant passageway circumferentially surrounds each of the blind-hole apertures.

* * * * *